Jan. 30, 1934.                    H. A. GARRETT                    1,945,430
                                  COMPOUND TOOL
                               Filed July 29, 1932                3 Sheets-Sheet 1
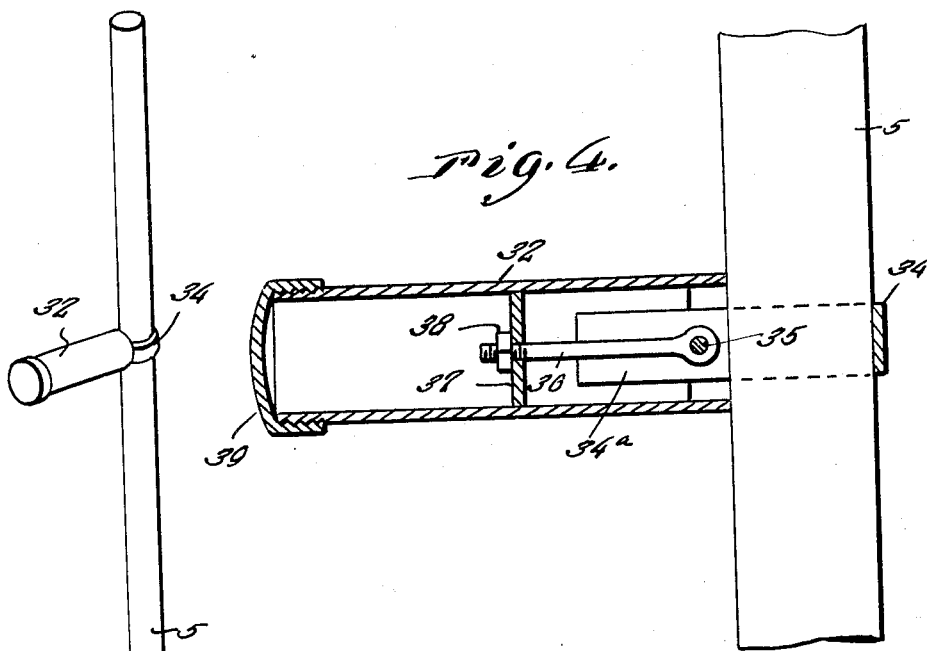
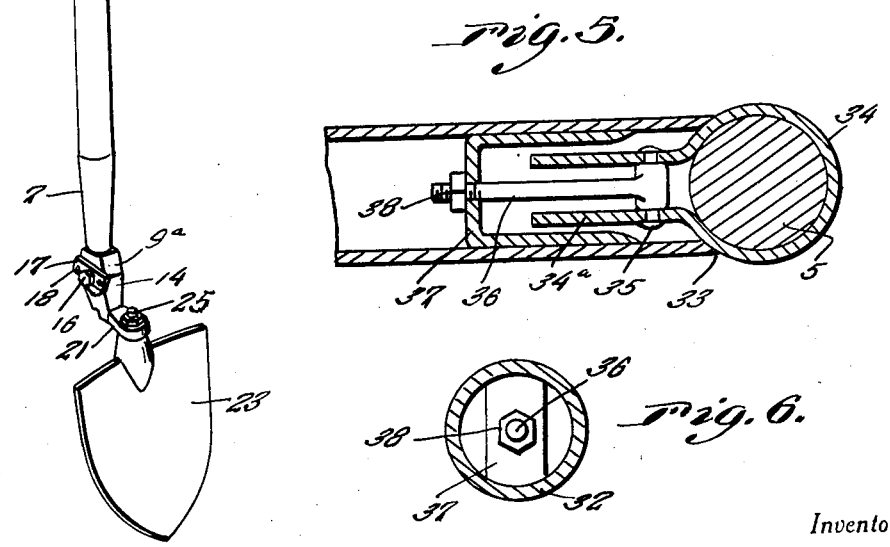
Inventor
Henry A. Garrett
By Clarence A. O'Brien
Attorney

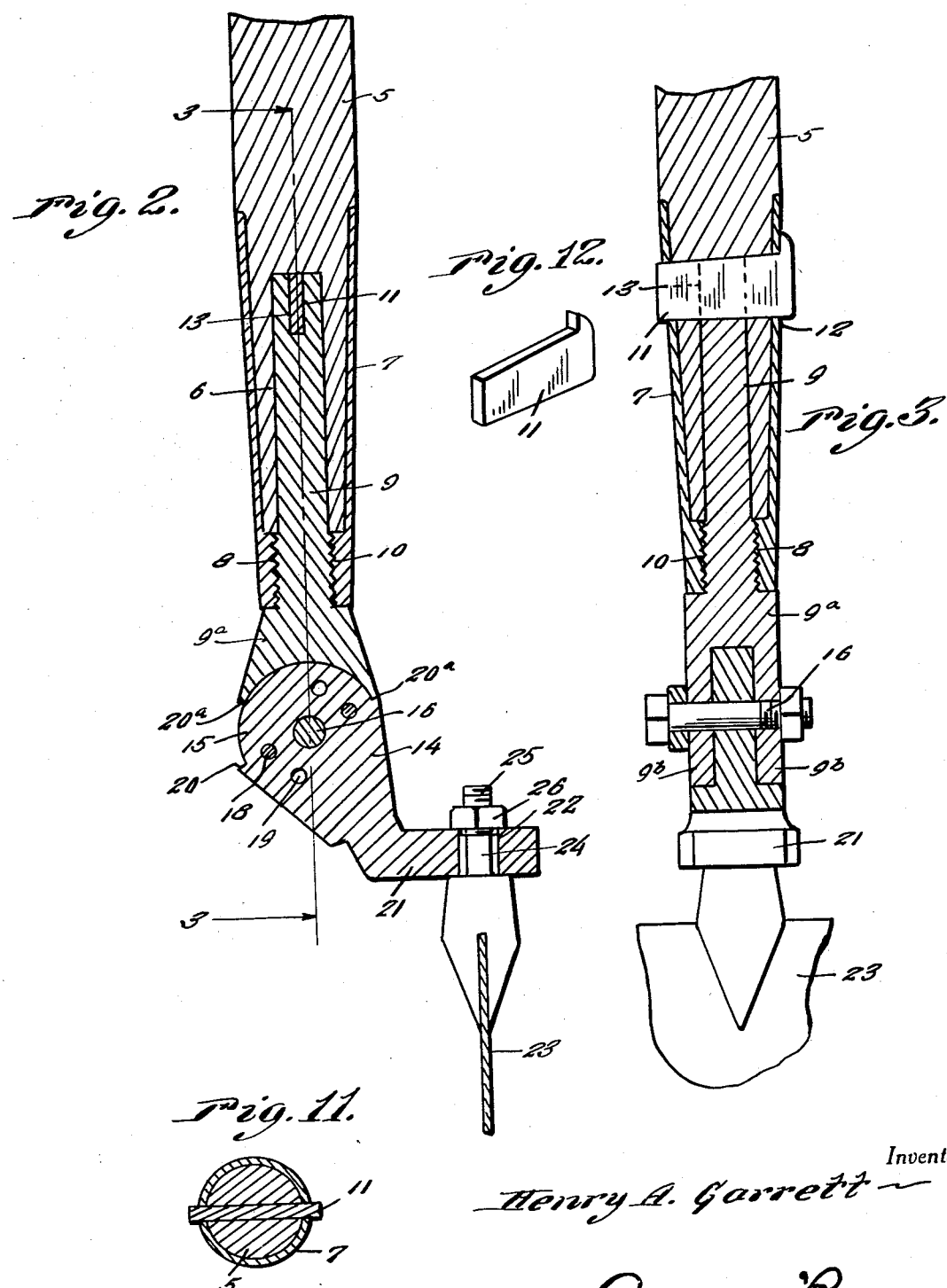

Jan. 30, 1934.            H. A. GARRETT            1,945,430
                           COMPOUND TOOL
                        Filed July 29, 1932            3 Sheets-Sheet 3

Inventor
Henry A. Garrett

By Clarence A. O'Brien
                    Attorney

Patented Jan. 30, 1934

1,945,430

UNITED STATES PATENT OFFICE 1,945,430

COMPOUND TOOL

Henry Albert Garrett, Xenia, Ohio

Application July 29, 1932. Serial No. 625,964

1 Claim. (Cl. 306—14)

This invention relates to compound tools having improved means for attaching to a handle in various positions of adjustment any one of a plurality of garden tools as for example a hoe, a sickle blade, a rake or the like.

The invention together with its numerous objects and advantages will be best understood from a study of the following description taken in connection with the accompanying drawings wherein:

Figure 1 is a perspective view of one form of implement embodying the features of the present invention.

Figure 2 is a longitudinal sectional view through a portion of the tool.

Figure 3 is a sectional view taken substantially on the line 3—3 of Figure 2.

Figure 4 is a fragmentary sectional elevational view showing the manner of adjustably securing a hand grip to the handle.

Figure 5 is a fragmentary longitudinal sectional view through a portion of the hand grip for more clearly showing the manner of securing the same to the main handle.

Figure 6 is a transverse sectional view through the hand grip.

Figure 7 is a side elevational view of a portion of the tool equipped with a sickle blade.

Figure 8 is a fragmentary sectional elevational view showing more clearly the manner of securing the tool per se at the desired adjustment relative to the handle of the implement.

Figure 9 is a perspective view of a rake head.

Figure 10 is a perspective view of a pin equipped plate forming part of the invention and Figure 11 is a transverse sectional view showing the arrangement of the pin and ferrule on the handle of the implement.

Figures 7, 8, 9, 10:
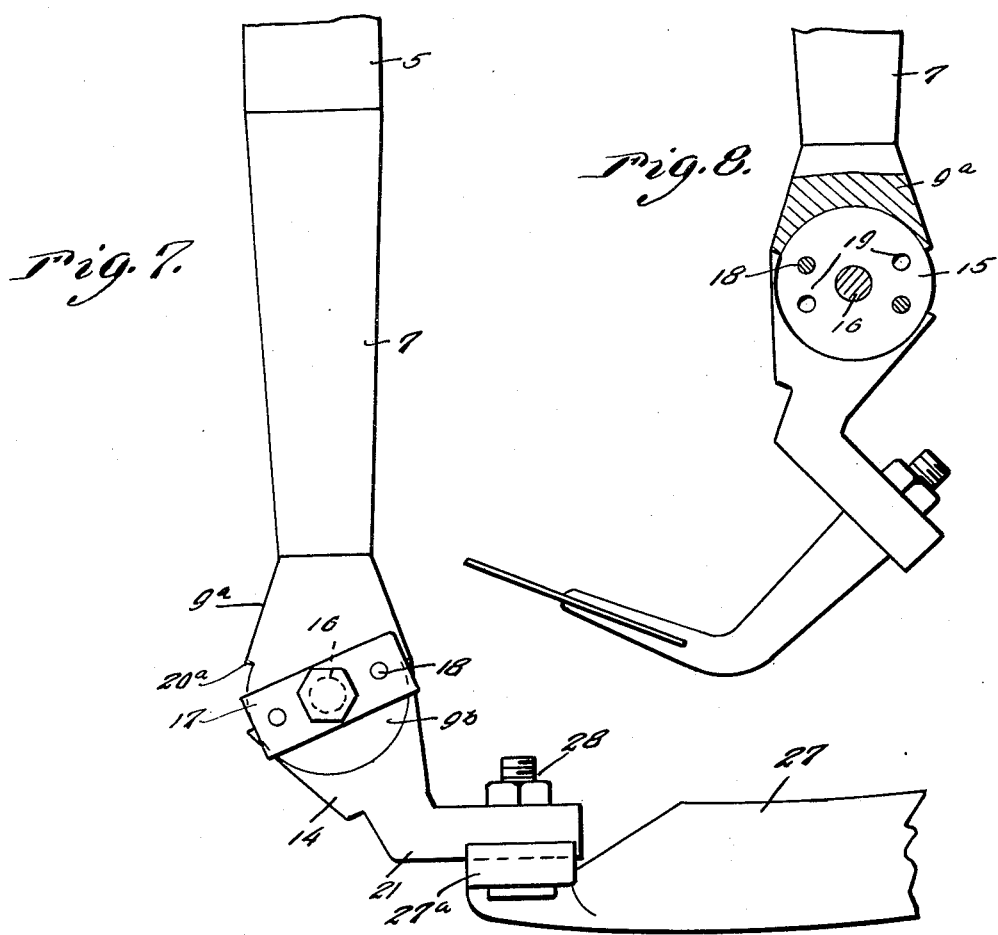

Referring more in detail to the drawings it will be seen that the implement comprises a main handle 5 having a tapered end provided with an axial socket 6. A correspondingly tapered ferrule 7 is fitted on the tapered end of the handle 5 and at its smallest end the ferrule 7 has a bore or opening therethrough alining with the socket 6 and threaded as at 8.

A shank 9 is adapted to fit snugly within the socket 6 and is provided with threads 10 for cooperation with the threads 8 to secure the shank within the socket.

The ferrule 7 is also secured on the handle 5 against longitudinal movement through the medium of a wedge pin 11 that extends transversely through the handle 5, the handle at the inner end of the socket 6 being provided with openings for receiving the pin, and alining with the aforementioned openings in the handle are openings 12 provided in the ferrule 7. It will be also noted that at its inner end the shank 9 is provided with a slot 13 for accommodating the wedge pin 11.

The shank 9 has an enlarged end 9a bifurcated forming ears 9b. A head member 14 has formed integral therewith a disk 15 received between the ears 9b and pivoted thereto as at 16.

A clamping plate 17 is provided with a centrally located aperture for accommodating the pivot bolt 16 and is also provided with a pair of pins 18 which, when the head 14 is adjusted at the desired angle relative to the handle 5, engage with a pair of apertures 19 provided in the head 14 and alining with one pair of apertures provided in each of the ears 9b, whereby the head 14 may be secured at the desired adjustment. Head 14 is also provided with stop shoulders 30 to engage abutments 20a provided on the end 9a of the shank for limiting rotative movement of the head 14 relative to the shank.

Head 14 is also tapered as shown, and at its smallest end merges into an angularly disposed lug 21 provided with a non-circular opening 22.

The several forms of tool usable with the head 14 are shown in Figures 1, 7 and 9. In Figure 1 I have shown the tool consisting of a blade 23 having a shank provided with a non-circular portion 24 to fit within the opening 22 and a threaded portion 25 with which is engaged a nut 26 for securing the blade to the lug 21.

In Figure 7 I have shown a sickle blade 27 provided at one end with a head 27a secured to the lug 21 as at 28 in substantially the same manner as the aforementioned blade 23 is secured to the lug.

The rake head shown in Figure 9 is designated by the reference character 29 and similar to the blade 23 is provided with a shank having a non-circular portion 30 and a threaded portion 31 so that said rake head 29 may be secured to the lug 21 in substantially the same manner as is the blade 23.

To adapt the implement to a sickle or the like there is also provided an auxiliary handle designated generally by the reference character 32. The handle 32 comprises a cylindrical body provided at one end as at 33 to engage the handle 5 at right angles to the handle and to accommodate a securing strap 34 that embraces the handle 35 and has its ends extending into the handle 32 as shown. The ends 34a of the handle are connected by a pivot bolt 35 and connected to the pivot bolt 35 is an adjusting bolt 36 that has a threaded end extending through the web of a substantially U-shaped member 37 fixedly secured within the handle 32 by welding or in any other manner desired. Obviously when the nut 38 is tightened on the threaded end of the bolt 36 the strap 34 will be tightened about the handle 5 and the end 33 of the handle 32 forced into intimate contact with the handle 5, and the handle 32 thus secured on the handle 5 at the desired adjustment.

Access to the nut 38 for turning it may be had through that end of the handle 32 farthest remote from the handle 5. At said end of the handle 32 the same is threaded and has a cap 39 screwed thereon.

From the foregoing it will be seen that I have devised a tool or implement wherein the same handle and head may be used with various tools necessary for gardening.

Even though I have herein shown and described the preferred embodiment of the invention, it is to be understood that the same is susceptible of further changes, modifications and improvements coming within the scope of the appended claim.

Having thus described my invention, what I claim as new is:

In a device of the character described the combination with a shank having an enlarged head provided at one end with an arcuate recess, and spaced parallel apertured ears projecting from said end of the head at opposite sides of the recess, and a member having one end thereof adapted for disposition between said ears, and provided at said end with a substantially semi-circular extension engaging in said recess, and also having at the end thereof remote from said extension an integral tool attaching lug disposed at an angle to said member, said member and the semi-circular extension thereof being also provided with apertures, and said ears being provided with apertures with which the first named apertures are adapted to register when said member is disposed at a desired angular adjustment relative to the head, a plate laterally engaging one of said ears and provided with pins for engaging the registered apertures for holding said member at the desired adjustment, and a pivot bolt extending through said plate, ears, and member for securing said plate, shank head, and member in assembled relation.

HENRY ALBERT GARRETT.